United States Patent [19]

Scholl et al.

[11] 4,102,699

[45] Jul. 25, 1978

[54] STABLE AQUEOUS ALKALI METAL SILICATE/IRON OXIDE PIGMENT SUSPENSIONS

[75] Inventors: Hans-Joachim Scholl; Peter Markusch, both of Cologne; Dieter Dieterich, Leverkusen, all of Germany

[73] Assignee: Bayer Aktiengesellschaft, Leverkusen, Germany

[21] Appl. No.: 797,952

[22] Filed: May 18, 1977

[30] Foreign Application Priority Data

Jun. 2, 1976 [DE] Fed. Rep. of Germany ....... 2624790

[51] Int. Cl.² ............................................. C09D 1/02
[52] U.S. Cl. ..................................................... 106/84
[58] Field of Search ................................ 106/84, 304

[56] References Cited

U.S. PATENT DOCUMENTS

| | | | |
|---|---|---|---|
| 2,845,394 | 7/1958 | Thompson | 106/84 |
| 3,100,154 | 8/1963 | Oshima et al. | 106/84 |

*Primary Examiner*—J. Poer
*Attorney, Agent, or Firm*—Gene Harsh; Joseph C. Gil; William E. Parry

[57] ABSTRACT

This invention relates to aqueous alkali metal silicate/iron oxide pigment suspensions which are resistant to sedimentation, to a process for the preparation thereof and to the use thereof. The pigment suspensions comprise:

A. from about 10 to about 40%, by weight, of iron oxide pigment,

B. from about 20 to about 40%, by weight, of alkali metal silicate and

C. from about 30 to about 70%, by weight, of water, wherein at least 95% by weight of the iron oxide pigment has a particle size equal to or less than 1 μ.

9 Claims, No Drawings

STABLE AQUEOUS ALKALI METAL SILICATE/IRON OXIDE PIGMENT SUSPENSIONS

BACKGROUND OF THE INVENTION

The resistance of iron oxide pigment to conventional binders, such as water glass, is well known in the art.

Aqueous suspensions of iron oxide pigment in water glass generally separate rapidly and must therefore be stirred before use.

DESCRIPTION OF THE INVENTION

It has now surprisingly been found that some aqueous alkali metal silicate/iron oxide pigment suspensions are resistant to sedimentation within a certain range of concentrations if at least 95% by weight of the iron oxide pigment has a particle size of $\leq 1 \mu$, preferably from 0,1 to 0,6 $\mu$.

It has also been found that these sedimentation - resistant suspensions are particularly suitable for the preparation of organic-inorganic synthetic resins. Particularly advantageous results are obtained using undried iron oxide pigments used in the form of their hydrates.

The present invention therefore relates to aqueous, sedimentation-resistant alkali metal silicate/iron oxide pigment suspensions comprising:
from about 10 to about 40, preferably from about 20 to about 40%, by weight, of iron oxide pigment,
from about 20 to about 40, preferably from about 20 to about 30%, by weight, of alkali metal silicate and
from about 30 to about 70, preferably from about 40 to about 60%, by weight, of water, at least 95% by weight of the iron oxide pigment consisting of particles smaller than or equal to 1 $\mu$.

The present invention also relates to a process for the preparation of such suspension by stirring suitable aqueous slurries of iron oxide pigment into aqueous alkali metal silicate solutions.

The alkali metal silicates used are preferably sodium and potassium silicates. They may, for example, already be in the form of solutions and may contain conventional impurities. Particularly suitable are solutions of sodium silicate having a molar ratio of $Na_2O:SiO_2$ of from about 1:1.6 to about 1:3.3, most preferably from about 1:2 to about 1:2.5.

Conventional commercially available natural and synthetic iron oxide pigments may be used, e.g. those described in Ullmanns Encyklopädie der technischen Chemie, Verlag Urban u. Schwarzenberg, Munich 1962, volume 13, p. 795.

The pigments used are of the type in which at least 95% by weight of the particle size does not exceed 1 $\mu$. Particularly preferred are artificial pigments at least 95% by weight of which having a particle diameter of from 0.1 to 0.6 $\mu$ as obtained by the reduction of aromatic nitro compounds with iron.

Commercial pigments of this type may be suspended in aqueous alkali metal silicate solutions as dry pigments, optionally after annealing, but this method requires very vigorous mixing to produce a stable suspension. Initially, therefore, it is advisable to stir up the solid iron oxide in water. In the process according to the present invention, however, it is preferred to use unannealed iron oxide pigments in the form of their hydrates, e.g. the pigments obtained as filter sludge from the reduction of aromatic nitro compounds with iron. These aqueous iron oxide slurries may be suspended without difficulty and without elaborate mixing techniques in alkali metal silicate solutions to form sedimentation-resistant suspensions.

The suspensions according to the present invention are resistant to sedimentation over a period of from several days to several months. No phase separation into an upper, water clear phase and a lower, opaque pigment phase is observed during this time. Systems which show such characteristic phase separation occurring within a few hours as may be seen from the Examples do not lie within the scope of the present invention.

The color of the suspensions of the present invention is determined by the color of the iron oxide pigment itself. It may be, for example, yellow, red, brown, mauve or black. These suspensions have excellent flow properties. Their viscosities lie in the region of from 100 to 15,000 cP, depending on their solids content. The suspensions according to the present invention are suitable for use as fire retarding paints and/or as a component in making fire retarding paint. They have improved water resistance and a reduced tendency to bleeding. They are particularly suitable as inorganic components for the production of inorganic-organic synthetic resins which are prepared e.g. by aid of water glass according to German Auslegeschrift 2,227,147 (U.S. Ser. No. 527 476, filed Nov. 26, 1974) and U.S. Pat. No. 3,983 081. These resins, however, show in some cases undesired swelling under the action of moisture. Accordingly prepared synthetic resins based on the suspensions according to the present invention show considerably reduced swelling under the action of moisture though these suspensions can also contain a high proportion of water glass.

The following Examples illustrate the present invention. (All percentages given in the Examples are percentages, by weight, unless otherwise indicated). A rotary viscometer with an appropriate spindle was used to measure suspension viscosities.

EXAMPLES

EXAMPLE 1

1,000 g of a filter sludge of the type "iron black 320" manufactured by Bayer AG, Leverkusen, Germany, having a solids content of 62% and at least 95% by weight having particle size of 0.2 $\mu$ (the pigment particles are spherical) are stirred at room temperature into 1,000 g of a 34% sodium silicate solution having an $SiO_2/Na_2O$ ratio of 2.0:1. The resulting sedimentation resistant suspension has the following composition:
31%, by weight, of iron oxide,
27%, by weight, of sodium silicate and
42%, by weight, of water.

EXAMPLE 2

1,000 g of a 54% sodium silicate solution ($SiO_2:Na_2O$ = 2:1) were mixed with 1,000 g of a filter sludge of the type "iron oxide yellow 910" of Bayer AG, Leverkusen, Germany, which has a solids content of 46% and to an extent of at least 95% by weight a particle size of from 0.1 to 0.6 $\mu$, in the same way as in Example 1 (the pigment particles are rod shaped). The resulting sedimentation resistant suspension has the following composition:
23%, by weight, of iron oxide,
27%, by weight, of sodium silicate and
50%, by weight, of water.

EXAMPLE 3

1,000 g of a 44% sodium silicate solution ($SiO_2:Na_2O = 2:1$) were mixed in the same way as in Example 1 with 1,000 g of an aqueous slurry of "iron oxide red 130M" of Bayer AG, Leverkusen, Germany, which had a solids content of 75% and to at least 95% by weight a particle size of $0.2\mu$. The resulting sedimentation resistant suspension has the following composition:
  36.5%, by weight, of iron oxide,
  22%, by weight, of sodium silicate and
  40.5%, by weight, of water. Examples 1–3 and other mixtures containing varying proportions of iron oxide pigments to alkali metal silicate and prepared as in Example 1 are listed in Table 1. Mixtures outside the particle size range according to the present invention give rise to suspensions which undergo sedimentation within a short time, as may be seen from comparison Examples 7 to 10.

Table 1

| Ex. | Na-silicate %, by weight | $SiO_2:Na_2O$ molar ratio | Iron Oxide %, by weight | Type* | Particle size ($\mu$) | Viscosity (cP) | Stability (days) |
|---|---|---|---|---|---|---|---|
| 1 | 27 | 2:1 | 31 | black 320 | 0.2 | 1800 | > 20 days |
| 2 | 27 | 2:1 | 23 | yellow 920 | 0.1 × 0.6 | 6000 | > 20 days |
| 3 | 22 | 2:1 | 37.5 | red 130 M | 0.2 | 1600 | > 10 days |
| 4 | 22 | 2.5:1 | 31 | black 320 | 0.2 | 1200 | > 4 days |
| 5 | 22 | 2.5:1 | 23.5 | yellow 920 | 0.1 × 0.6 | 9000 | > 10 days |
| 6 | 27 | 2:1 | 37 | black 320 | 0.2 | 2400 | > 20 days |
| 7 | 17 | 3:1 | 12 | yellow 920 | 0.1 × 0.6 | 800 | > 1 day |
| 8 | 14 | 2:1 | 31 | black 920 | 0.2 | 200 | > 1 day |
| 9 | 18 | 3:1 | 31 | black 920 | 0.2 | 1000 | > 1 day |
| 10 | 17 | 3:1 | 35 | red 130 M | 0.2 | 400 | > 1 day |

EXAMPLE 11

An organic/inorganic material was prepared from the following mixture according to U.S. Pat. No. 3,983,081.
  400 g of sulphonated polyphenyl-polymethylene polyisocyanate obtained by aniline-formaldehyde condensation followed by phosgenation and sulphonation using gaseous sulphur trioxide (sulphur content 0.98%, NCO content 30.2%, viscosity at 22° C 1200 cP; for method of preparation see German Patent 2,227,111)
  75 g of trichlorofluoromethane
  4 g of triethylamine as catalyst
  0.5 g of "L 5340" (polyether polysiloxane of Union Carbide Corp. as foam stabilizer)
  500 g of aqueous sodium silicate solution (44% solids content, $SiO_2:Na_2O = 2:1$)
  300 g of aluminous cement "Fondu Lafarge"
  "Fondu Lafarge" is the trade name of a high alumina cement which sets very rapidly (see Kirk-Othmer: Encyclopedia of Chemical Technology 2, Edit., Vol 4, Page 696)
  1 g of 50% Na salt of a sulphochlorinated $C_{10}$-$C_{14}$ paraffin mixture as emulsifier. The sulphonated polyisocyanate was vigorously mixed at room temperature with the catalyst, foam stabilizer and trichlorofluoromethane. The sodium silicate solution, emulsifier and Lafarge cement were separately mixed. The two mixtures were then rapidly stirred together for 25 seconds, using a high speed stirrer. The reaction mixture was poured into an open box form and began to foam up after 40 seconds. After 80 seconds, it had already solidified to a high strength aerated concrete having a regular cell structure.

To determine the unit weight, compression resistance and swelling (7 days under water), the concrete was cut up into test samples.
  Density: 163 kg/m³
  compression strength: 0.80 MPa
  swelling: 5.1%.

EXAMPLE 12

An aerated concrete prepared from the same formulation, but without Lafarge cement had the following properties:
  Density: 139 kg/m³
  compression strength: 1.02 MPa
  swelling: 7.4%.

EXAMPLE 13

The following components were used:
  400 g of the sulphonated polyisocyanate of Example 11
  80 g of trichlorofluoromethane
  7 g of triethylamine
  0.5 g of "L 5340" of Example 11
  150 g of the aqueous sodium silicate solution of Example 11
  1 g of the emulsifier of Example 11
  700 g of the iron oxide suspension of Example 1.

The components were mixed as described in Example 11. Foaming set in after 33 seconds and the foam hardened after 60 seconds.
  Density: 149 kg/m³
  compression strength: 0.72 MPa
  swelling: 0.4%.

EXAMPLE 14

400 g of the sulphonated polyisocyanate of Example 11
  75 g of trichlorofluoromethane
  7 g of triethylamine
  0.5 g of "L 5340" of Example 11
  150 g of the aqueous sodium silicate solution of Example 11
  1 g of the emulsifier of Example 11
  700 g of the iron oxide suspension of Example 1
  300 g of Lafarge cement.

The components were mixed as indicated in Example 11. Foaming set in after 30 seconds and the foam hardened after 65 seconds.
  Density: 207 kg/m³
  compression strength: 0.90 MPa
  swelling: 0.1%.

EXAMPLE 15

400 g of the sulphonated polyisocyanate of Example 11
  60 g of trichlorofluoromethane
  6.0 g of triethylamine
  0.5 g of "L 5340" according to Example 11
  200 g of the aqueous sodium silicate solution of Example 11
  1.0 g of the emulsifier of Example 11
  600 g of the iron oxide suspension of Example 6.

The components were mixed as described in Example 11. The foaming process set in after 30 seconds and the foam had hardened after 65 seconds.

Density: 124 kg/m³
compression strength: 0.45 MPa
swelling: 0%

EXAMPLE 16

400 g of the sulphonated polyisocyanate of Example 11
70 g of trichlorofluoromethane
7.0 g of triethylamine
0.5 g of "L 5340" according to Example 11
300 g of the aqueous sodium silicate solution of Example 11
1.0 g of the emulsifier of Example 11
400 g of the iron oxide suspension of Example 2.

The components were mixed as indicated in Example 11. The foaming process set in after 32 seconds and the foam had hardened after 70 seconds.

Density: 138 kg/m³
compression strength: 0.84 MPa
swelling: 0.1%

EXAMPLE 17

400 g of the sulphonated polyisocyanate of Example 11
60 g of trichlorofluoromethane
7.0 g of triethylamine
0.5 g of "L 5340" according to Example 11
400 g of the aqueous sodium silicate solution of Example 11
1.0 g of the emulsifier of Example 11
200 g of the iron oxide suspension of Example 2
300 g of Lafarge cement.

The components were mixed as indicated in Example 11. The foaming process set in after 29 seconds and the foam had hardened after 55 seconds.

Density: 183 kg/m³
compression strength: 1.1 MPa
swelling: 0.9%

The swelling values after 7 days storage under water obtained for aerated concrete based on the sedimentation-resistant suspensions of the present invention are in the region of from 0 to 0.9% (Examples 13 - 17). These values are considerably lower than the corresponding values obtained for aerated concrete prepared without the aid of such suspensions, as may be seen from Examples 11 (5.1%) and 12 (7.4%).

What is claimed is:

1. Aqueous, sedimentation-resistant alkali metal silicate/iron oxide pigment suspensions comprising:
   A. from about 10 to about 40%, by weight, of iron oxide pigment,
   B. from about 20 to about 40%, by weight, of alkali metal silicate and
   C. from about 30 to about 70%, by weight, of water, wherein at least 95% by weight of the iron oxide pigment has a particle size equal to or less than 1 μ.

2. The suspensions of claim 1 comprising:
   A. from about 20 to about 40%, by weight, of iron oxide pigment,
   B. from about 20 to about 30%, by weight, of alkali metal silicate and,
   C. from about 40 to about 60%, by weight, of water.

3. The suspensions of claim 1 wherein the particle size is from 0.1 to 0.6μ.

4. The suspensions of claim 1 wherein the iron oxide pigment is undried and in the form of its hydrate.

5. The suspensions of claim 3 wherein the iron oxide pigment is in the form of filter sludge of the type obtained by reduction of aromatic nitro compounds with iron.

6. The suspensions of claim 1 wherein the alkali metal silicate is a sodium and/or potassium silicate.

7. The suspensions of claim 6 wherein the sodium silicate has a $Na_2O:SiO_2$ molar ratio of from about 1:1.6 to about 1:3.3.

8. The suspensions of claim 6 wherein the sodium silicate has a $Na_2O:SiO_2$ molar ratio of from about 1:2 to about 1:2.5.

9. A process for the preparation of aqueous, sedimentation-resistant alkali metal silicate/iron oxide pigment suspensions comprising mixing:
   A. an aqueous iron oxide pigment slurry with
   B. an aqueous alkali metal silicate solution wherein the suspension produced comprises:
      i. from about 10 to about 40%, by weight, of iron oxide pigment,
      ii. from about 20 to about 40%, by weight, of alkali metal silicate and
      iii. from about 30 to about 70%, by weight, of water, wherein at least 95% by weight of the iron oxide pigment has a particle size equal to or less than 1 μ.

* * * * *